March 26, 1963        G. STAVIS        3,083,362
MICROWAVE BEAMING SYSTEM

Filed Feb. 19, 1960        2 Sheets-Sheet 1

INVENTOR.
GUS STAVIS

BY
ATTORNEY.

March 26, 1963  G. STAVIS  3,083,362
MICROWAVE BEAMING SYSTEM
Filed Feb. 19, 1960  2 Sheets-Sheet 2
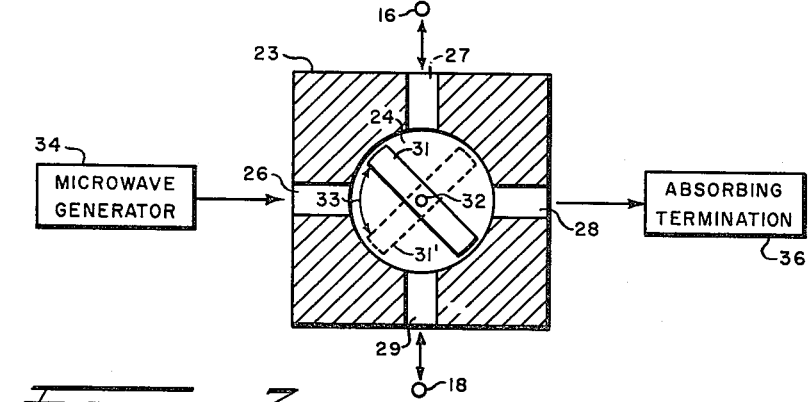
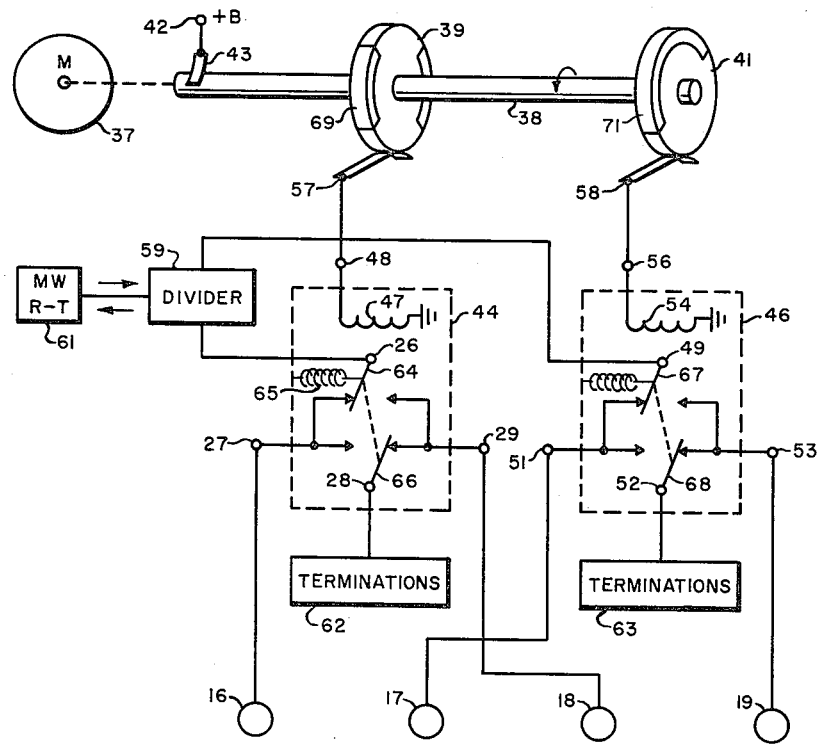
INVENTOR.
GUS STAVIS
BY
ATTORNEY.

United States Patent Office 3,083,362
Patented Mar. 26, 1963

3,083,362
MICROWAVE BEAMING SYSTEM
Gus Stavis, Briarcliff Manor, N.Y., assignor to General Precision, Inc., a corporation of Delaware
Filed Feb. 19, 1960, Ser. No. 9,968
7 Claims. (Cl. 343—100)

This invention relates to microwave antennas which emit a plurality of beams in selected combinations and sequences, and particularly to a combination of such an antenna and switches for securing desired beam patterns.

In some systems of airborne Doppler radar systems for measuring horizontal and vertical velocities, antenna arrangements are employed emitting at least three beams obliquely toward the earth in different directions. Although four beams provide redundant information, added convenience in processing the received signals sometimes dictates their use. When four beams are employed a number of arrangements and sequences are possible.

It has been found that when a fixed antenna is used and certain patterns and beaming sequences of four beams are employed to secure along-heading and cross-heading information, the loss of a single beam return due to aircraft rolling or pitching will cause the complete loss of either the along-heading information for the cross-heading information. This is particularly true when the beams are emited in pairs and the received echoes are beat against each other, in the so-called "Janus" method, to secure a Doppler information frequency spectrum which is the sum of the Doppler frequency spectra in each of the two beams. The loss of information will continue as long as the beam continues out of contact with the earth, which may continue for a number of seconds. This may constitute a serious operating difficulty.

This invention provides an antenna system for emitting four beams. The system is immovably secured to the airframe. The beams are directed toward the earth at equal incidence angles of, for example, ten degrees, and strike the earth at points half-way between the along-heading and cross-heading directions, which may be termed the intercardinal directions. Thus the four beams are emitted in the directions fore-right, aft-right, aft-left, and fore-left.

Several kinds of antennas may be employed alternatively in this invention, the simplest in concept being merely four dish antennas pointed in the four desired directions. However, space and weight considerations dictate the use of a simple planar antenna positioned with its two axes parallel to the centerline and transverse axis of the aircraft. All antennas useful in this invention are characterized by having four microwave terminals which may be energized individually or together, each causing the emission of one of the four beams.

In the operation of this antenna, two antenna terminals are energized by microwave energy simultaneously, then two other terminals, and so on until four possible combinations of the terminals in pairs have been employed, when the sequence is repeated. There are six possible sequences, any one of which may alternatively be employed in this invention. One, for example, consists of these pair sequences: right pair, left pair, forward pair, aft pair.

In such operation, the right pair and left pair both give echo signals containing Doppler information which, when demodulated by the Janus method provide along-heading velocity information. Thus, the information is redundant as this information is given by either pair alone. However, if one of the four beams should fail as, for example, by a combination of large pitch and roll angles, the other pair would continue to provide the information and the result would be merely a reduction of one-half in the smoothed signal intensity. Similarly, the forward and aft pairs give the same cross-heading information, one pair being redundant, but the loss of one beam return will not cause the loss of information, but merely will reduce signal strength. Vertical velocity information will not be lost in any case.

The selective directing of microwave energy to the several antenna system terminals, and the transmission of echo energy from the antenna system, are accomplished by a series of microwave switches each of which is analogous to a single-pole, double-throw switch. Alternatively, microwave switches may with economy be employed having a function similar to that of a double-pole, double-throw switch. A form of microwave switch which may be connected to have either of these functions consists of a cylinder having four circumferential ports. A solenoid-operated vane in the cylinder directs microwave energy from one of the ports to either one of the adjacent ports.

A microwave switch of this form is described in U.S. Patent No. 2,690,539.

The purpose of this invention is to provide a multi-beam microwave antenna for use in Doppler systems which will function when any one of the beams is inoperative.

Another purpose of this invention is to provide a fixed airborne antenna for Doppler microwave systems which remains operative during rolling and pitching of the aircraft.

Further information may be secured from the detailed description and drawings, in which:

FIGURE 3 is a sectioned drawing of a microwave switch suitable for use with the invention.

FIGURE 4 is a schematic diagram of the apparatus of the invention.

Figure 1:
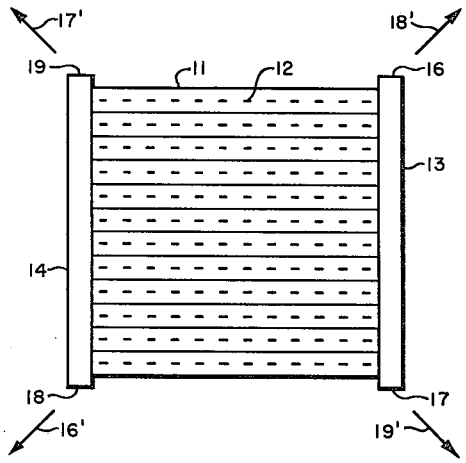
FIGURE 1 illustrates a form of antenna for use with the invention.

Referring now to FIGURE 1, a planar microwave antenna comprises a plurality of similar linear arrays, such as linear array 11, with the arrays positioned in parallel side-by-side relationship. Each linear array consists of a rectangular waveguide containing a plurality of similar slot radiators, such as slot 12, in one of its broad faces. The slot spacings are such that, when the linear array is non-reflectively terminated at one end and energized with microwave energy of suitable frequency at the other end, the linear array behaves as a so-called "inphase" array and emits energy in a cone at an oblique angle away from the energized end. The slots are aligned transversely to the linear arrays and similarly behave as inphase linear arrays in this direction. Two feed waveguides, 13 and 14, are provided. Each feed waveguide consists of a rectangular waveguide which is coupled to the adjacent ends of all of the linear array waveguides.

Figure 2:
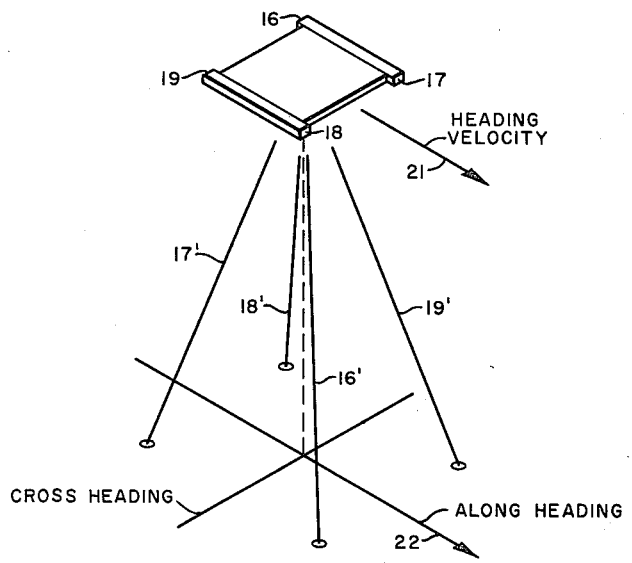
FIGURE 2 depicts the beams produced by the antenna of FIGURE 1.

In the operation of this planar microwave antenna, when microwave energy of suitable frequency is applied to the end terminal 16 of the feed waveguide 13, and the other three end terminals 17, 18 and 19 are terminated non-reflectively, a single microwave beam is emitted by the planar array in the direction 16'. This emitted beam is also angled away from the plane of the antenna so that it is represented in three dimensions as the beam 16', FIGURE 2.

When any two of the planar antenna terminals are energized and the remaining two are non-reflectively terminated, the antenna emits two beams corresponding to the two terminals which are energized. For example, when terminals 16 and 17 are energized beams 16' and 17' are emitted, when terminals 18 and 19 are energized, beams 18' and 19' are emitted, when terminals 16 and 19 are energized, beams 16' and 19' are emitted, and when terminals 17 and 18 are energized, beams 17' and 18' are emitted.

A suitable microwave switch for use with the antenna of FIGURE 1 is shown in FIGURE 3. A conductive switch body 23 is provided with a cylindrical space 24 having closed ends. Four arms at 90°: 26, 27, 28 and 29, form rectangular hollow waveguide entrances to the cylindrical space, the cross section being in the E-planes of these rectangular waveguide arms. A conductive vane 31, which may have the form of a one-eighth inch diameter round rod, is borne by a shaft 32 journalled in the closed ends of the cylinder 24. The shaft 32 is operated by a rotary solenoid and retracted by a spring. The shaft and vane are provided with stops so that the retracted position of the vane is that shown in full lines as vane 31, and the operated position is shown by the dashed outline 31'. The transit from one position to the other may be made through either quadrant, but is preferably made through the quadrant 33.

In the use of this switch in connection with the antenna of FIGURE 1, two opposite waveguide entrances or switch terminals, for example terminals 27 and 29, are connected to two diagonally opposite terminals of the antenna, such as terminals 16 and 18. One of the other switch terminals, such as terminal 26, is connected to a microwave generator 34 and the remaining switch terminal 28 is connected to an absorbing termination 36.

When the switch vane is in the normal position 31, the microwave terminals 26 and 29 are joined and energy flows from generator 34 to the antenna terminal 18. Also, the antenna terminal 16 is connected to the absorbing termination 36. When the switch vane is in the operated position 31', the generator 34 and the antenna terminal 16 are connected together for microwave transmission of energy between them and switch terminals 28 and 29 are connected together, terminating the antenna terminal 18 non-reflectively.

The antenna of FIGURE 1 and two microwave switches as shown in FIGURE 3 are combined with a timer and switch control circuit as shown in FIGURE 4 to form a complete beaming system. A motor 37 designed to rotate at five revolutions per second is connected to a shaft 38 carrying two commutators 39 and 41. Each commutator is divided into conducting and insulating sectors. A direct current terminal 42 is connected through a brush 43 to the conducting sectors. Two microwave switches, 44 and 46, are provided. Each is of the kind depicted in FIGURE 3, but is schematically depicted in terms of its function as, effectively, a double-pole double-throw switch. The four microwave terminals of the switch 44 are characterized by reference numerals 26, 27, 28 and 29, and represent the like-numbered microwave terminals of FIGURE 3. The terminal of the direct-current operating solenoid 47 is numbered 48. Similarly, microwave switch 46 has four microwave terminals 49, 51, 52 and 53, an operating solenoid 54, and a direct-current operating terminal 56. The two direct-current operating terminals 48 and 56 are connected respectively to brushes 57 and 58 bearing on the commutators 39 and 41. The microwave terminals 27, 51, 29 and 53 are connected respectively to the terminals 16, 17, 18 and 19, representing the terminals of the antenna as shown in FIGURE 1. The microwave terminals 26 and 49 are connected to a power divider 59 which is in turn connected to a microwave Doppler radar receiver-transmitter 61. The microwave terminals 28 and 52 are connected to two non-reflecting terminations 62 and 63. The microwave switch 44 is schematically depicted as having two switch arms, 64 and 66, shown as connected together for operations in concert, being depicted in the drawing in the normal position where they are held by the spring 65. Similarly, switch 46 is schematically shown with two arms, 67 and 68, in the normal position connected for operation in concert.

In the operation of the circuit of FIGURE 4, when the motor 37 positions the commutators in the positions shown, both brushes 57 and 58 are insulated, the switches 44 and 46 are in their normal positions, and microwave energy from the transmitter is equally divided by divider 59 and is transmitted through arms 64 and 67 to antenna terminals 16 and 17. At this time antenna terminals 18 and 19 are connected through switch arms 66 and 68 to the absorbing terminations 62 and 63. When the motor has moved the commutators to their second quadrants 69 and 71 both brushes are energized, energizing the solenoids 47 and 54, and both microwave switches are operated, applying microwave energy to antenna terminals 18 and 19 and terminating the other terminals 16 and 17 in the terminations 62 and 63. Similarly, in the third and fourth quadrants of the commutators, the antenna terminals are switched so that 16 and 19, then 17 and 18, are energized, with those not energized non-reflectively terminated.

In the normal resulting operation of the four antenna beams, along-heading velocity information is supplied by the beam pairs 16'/17' and 18'/19', each for a period of 1/20 second out of the 1/5 second complete beaming period. Similarly, beam pairs 16'/19' and 17'/18' supply cross-heading velocity information for periods of 1/20 second. Thus along-heading information is supplied for half of the period and cross-heading information for the remaining half of the period.

When any single beam is inoperative for a period of, say, six seconds, due to a combination of severe simultaneous pitching and rolling which lifts one beam from contact with the earth, one of these along-heading pairs is lost and one cross-heading pair is lost, but the other along-heading pair and cross-heading pair are not lost. Thus, along-heading and cross-heading data are continued, but with a hiatus in each, during each cycle, of 1/20 second. This hiatus is easily bridged in the frequency tracker which processes the data, so that the only effect of the loss of one beam is a reduction of one-half in strength of both the along-heading and cross-heading signals.

What is claimed is:

1. A microwave antenna beaming system for an airborne Doppler radar system comprising, an antenna assembly rigidly secured to an aircraft, means including said antenna assembly adapted to illuminate the earth's surface in four discrete areas located respectively forward and to the left of said aircraft, forward and to the right of said aircraft, rearward and to the left of said aircraft, and rearward and to the right of said aircraft, means including switch means for illuminating said areas in selected pairs, one of said pairs being those areas to the right of said aircraft, a second pair being those areas to the left of said aircraft, a third pair being those areas forward of said aircraft and the fourth pair being those areas to the rear of said aircraft.

2. A microwave antenna beaming system for an airborne Doppler radar system comprising, an antenna assembly emitting at least four beams rigidly secured to an aircraft, means including said antenna assembly for transmitting and receiving microwave energy along at least four beams directed downwardly toward the earth's surface, switching means activating a pair of said four beams directed to the right of said aircraft's longitudinal axis and forward and to the rear of the aircraft's transverse axis for a first period of time, said switching means activating a pair of said four beams directed to the left of said longitudinal axis and forward and to the rear of said transverse axis for a second period of time, said switching means activating a pair of said four beams directed forward of said transverse axis and to the right and left of said longitudinal axis for a third period of time, and said switching means activating a pair of said four beams directed to the rear of said transverse axis and to the right and left of said longitudinal axis for a fourth period of time, said enumerated time periods occurring sequentially in any selected order.

3. A microwave antenna beaming system for an airborne Doppler radar system comprising, an antenna assembly rigidly secured to an aircraft, said antenna assembly having four microwave terminals, means energizing one of said terminals for transmitting and receiving microwave energy along a beam directed to the right and forward of said aircraft, means energizing another of said terminals for transmitting and receiving microwave energy along a beam directed to the right and to the rear of said aircraft, means energizing still another of said terminals for transmitting and receiving microwave energy along a beam directed to the left and to the rear of said aircraft, means energizing the remaining said terminal for transmitting and receiving microwave energy along a beam directed to the left and forward of said aircraft, and means including switch means for energizing said four terminals a pair at a time whereby four different orthogonal pairs of beams are energized in sequence.

4. A microwave antenna beaming system in accordance with claim 3 in which said antenna assembly is a planar microwave antenna.

5. A microwave antenna beaming system for an airborne Doppler radar system comprising, an antenna assembly having four microwave terminals, said antenna assembly being rigidly secured to an aircraft, means including switches selectively applying microwave energy to said four microwave terminals, each said terminal when energized causing the excitation of one microwave beam of radiation for transmitting and receiving microwave energy directed downwardly from said aircraft in a specific direction, said means including switches simultaneously energizing a pair of said terminals to activate two of said four beams directed to the right of said aircraft's longitudinal axis and forward and to the rear of the aircraft's transverse axis for a first period of time, said means including switches simultaneously energizing another pair of said terminals to activate two of said four beams directed to the left of said aircraft longitudinal axis and forward and to the rear of the aircraft's transverse axis for a second period of time, said means including switches simultaneouly energizing still another pair of said terminals to activate two of said four beams directed forward of said aircraft's transverse axis and to the right and left of the aircraft's longitudinal axis for a third period of time, said means including switches simultaneously energizing a fourth pair of said terminals to activate two of said four beams directed to the rear of said aircraft's transverse axis and to the right and left of the aircraft's longitudinal axis for a fourth period of time, said enumerated time periods occurring sequentially in any selected order, said switching means also at all times connecting all unenergized terminals to respective non-reflective terminals.

6. A microwave antenna beaming system in accordance with claim 5 in which said means including switches comprises two similar microwave switches, each said microwave switch having a control terminal and four microwave terminals, means connecting two of the four microwave terminals of said antenna assembly to two microwave terminals of one of said two microwave switches, means connecting the remaining two of the four microwave terminals of said antenna assembly to two microwave terminals of the other of said two microwave switches, two non-reflective terminations, means connecting each said non-reflective termination to a respective one of the remaining microwave terminals of said two microwave switches, a microwave power divider, means energizing said microwave power divider, means connecting the two outputs of said power divider to the remaining microwave terminals of said microwave switches, and timing means consecutively energizing the control terminals of said microwave switches in all four possible combinations of energization and non-energization.

7. The method of operating a microwave antenna system for an airborne Doppler radar system comprising; during a first interval of time, transmitting and receiving a first pair of antenna beams from an antenna carried by an aircraft in directions extending to the right of the longitudinal axis of the aircraft and forward and to the rear of the transverse axis of said aircraft; during a second interval of time, transmitting and receiving a second pair of antenna beams from said antenna in directions extending to the left of said longitudinal axis and forward and to the rear of said transverse axis; during a third interval of time, transmitting and receiving a third pair of beams from said antenna in directions extending forward of said transverse axis and to the right and left of said longitudinal axis; during a fourth interval of time, transmitting and receiving a fourth pair of beams from said antenna in directions extending to the rear of said transverse axis and to the right and left of said longitudinal axis; said time intervals occurring sequentially in any selected order.

References Cited in the file of this patent

UNITED STATES PATENTS

| | | |
|---|---|---|
| 2,412,160 | Longfellow | Dec. 3, 1946 |
| 2,764,756 | Zaleski | Sept. 25, 1956 |
| 2,854,666 | Gamertsfelder | Sept. 30, 1958 |